Oct. 24, 1967  F. S. SILLARS  3,348,510
METHOD OF AND APPARATUS FOR MANUFACTURING TUBULAR BODIES
Filed May 19, 1965  6 Sheets-Sheet 1
Fig.1
Fig.2
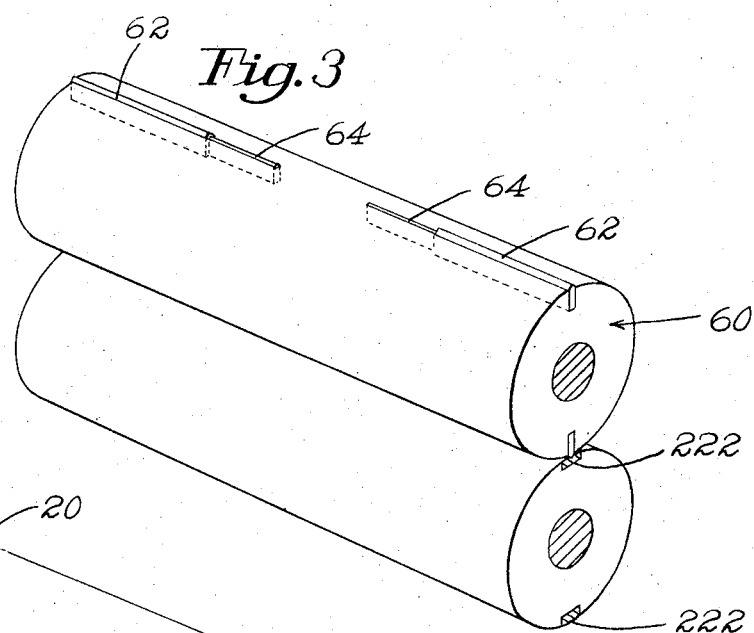
Fig.3
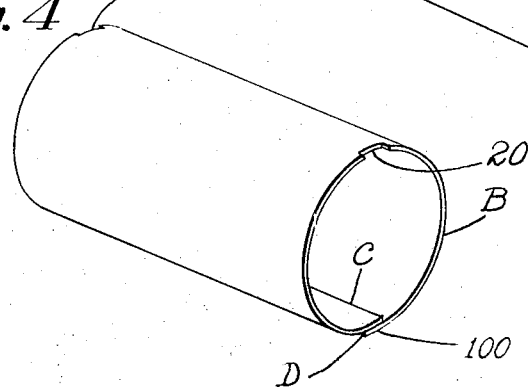
Fig.4
Inventor
Frederick S. Sillars
By his Attorney
Richard B. Megley

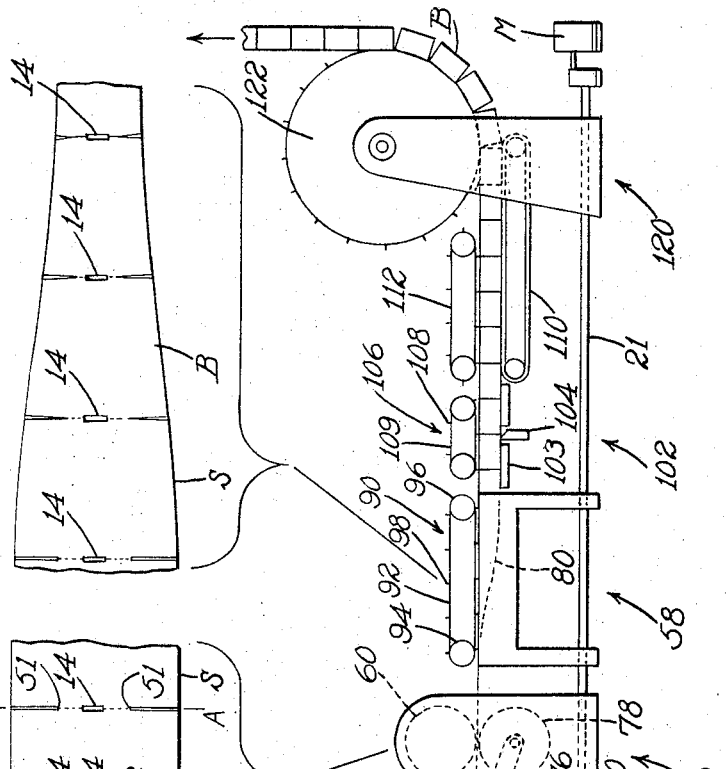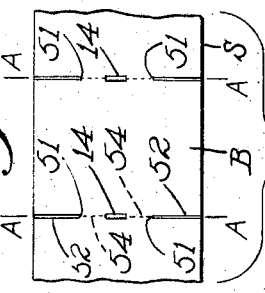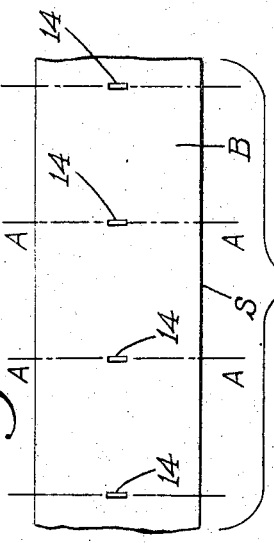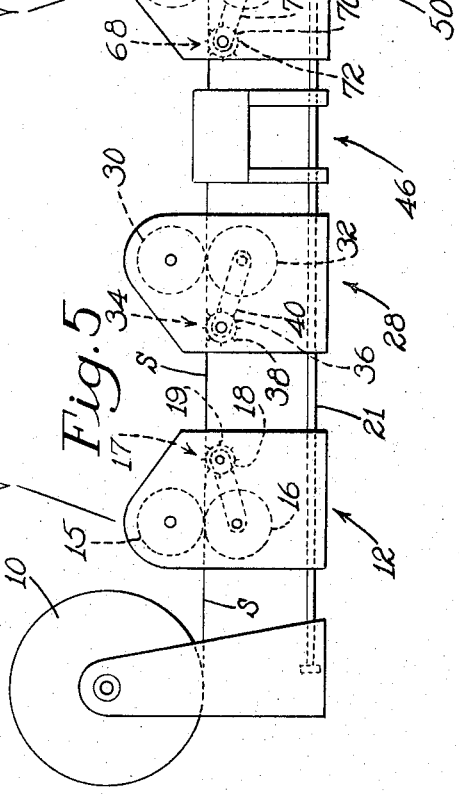

Oct. 24, 1967 F. S. SILLARS 3,348,510
METHOD OF AND APPARATUS FOR MANUFACTURING TUBULAR BODIES
Filed May 19, 1965 6 Sheets-Sheet 3
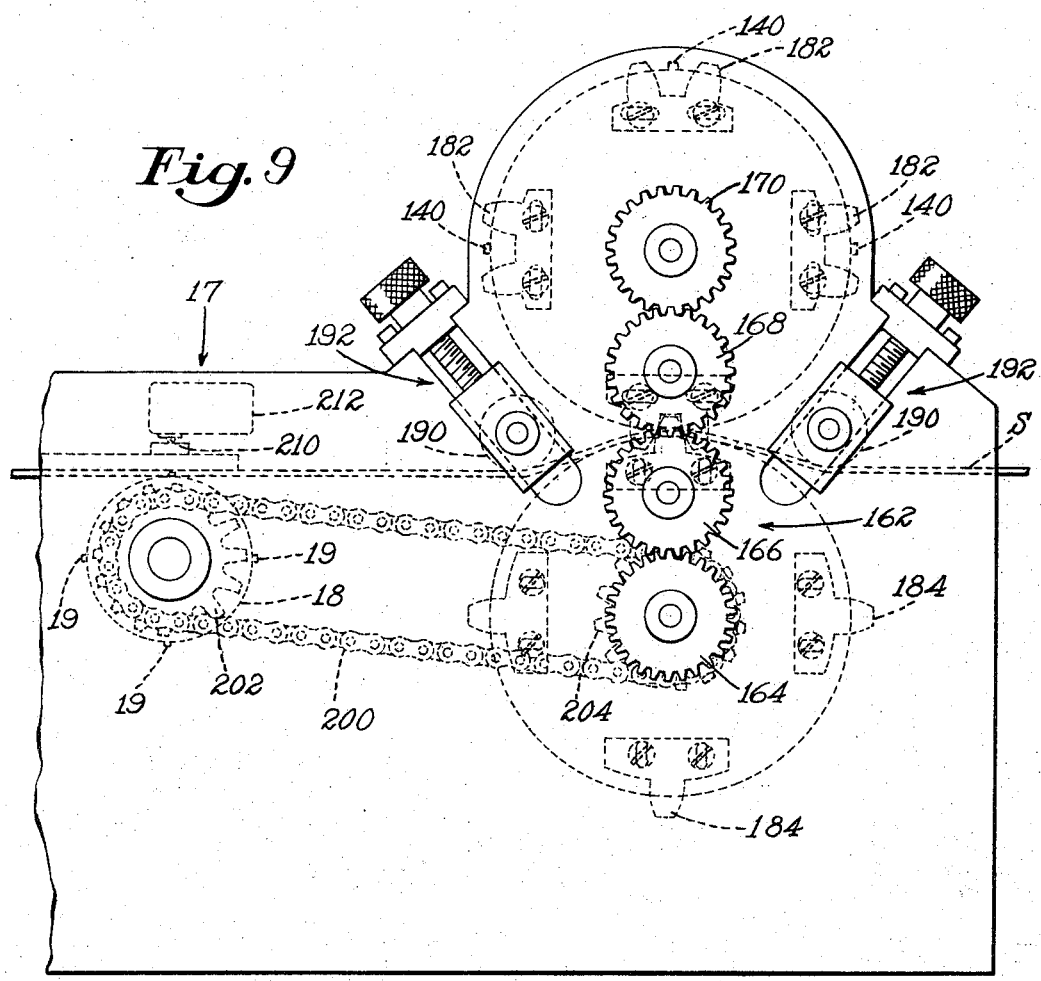

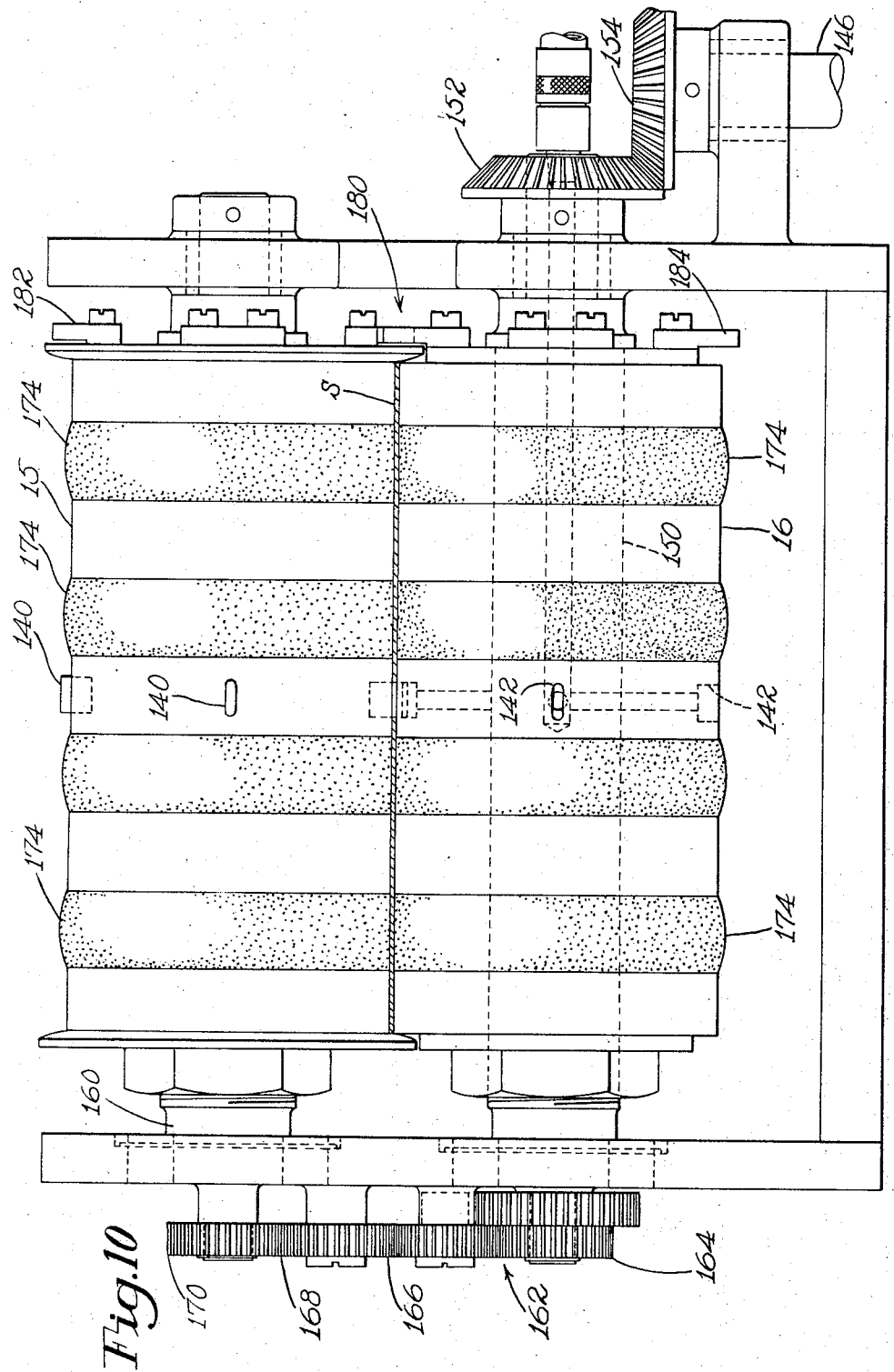

Oct. 24, 1967  F. S. SILLARS  3,348,510
METHOD OF AND APPARATUS FOR MANUFACTURING TUBULAR BODIES
Filed May 19, 1965  6 Sheets-Sheet 5

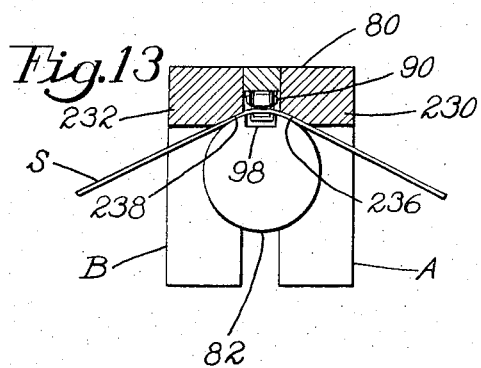
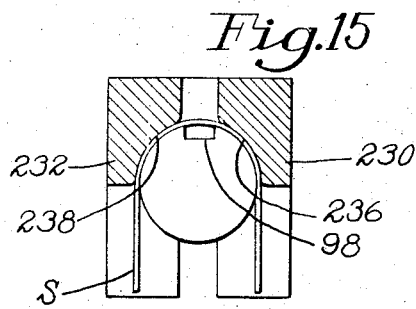
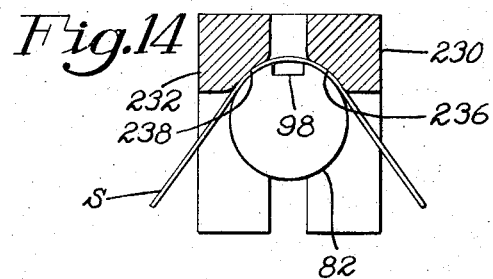
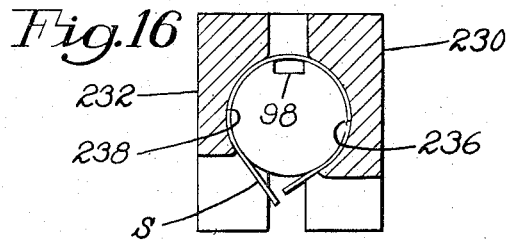
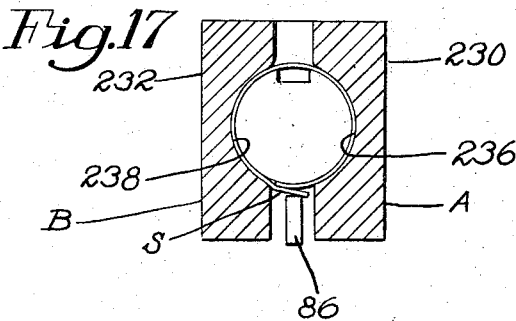
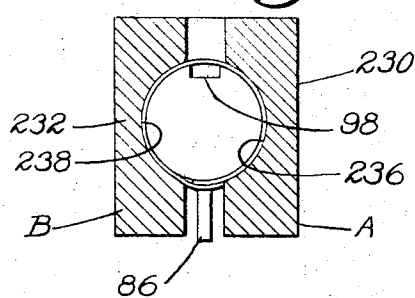

3,348,510
METHOD OF AND APPARATUS FOR MANUFACTURING TUBULAR BODIES
Frederick S. Sillars, 6 Grover St., Beverly, Mass. 01915
Filed May 19, 1965, Ser. No. 456,982
19 Claims. (Cl. 113—7)

This invention relates to a method of and apparatus for forming a container. More specifically, the invention relates to a novel method of manufacturing can bodies having a lap seam or a butt seam from a continuous sheet of stock in which unique means are employed to insure registration of the stock relative to operative instrumentalities and, further, relates to novel apparatus for implementing the method.

The bodies of "tin" cans commonly employed to package most foods are made on either wing-type or roll-form bodymakers from discrete, rectangular pieces of tin-coated steel which are formed into an open ended cylinder by interlocking narrow marginal portions of opposite parallel edges of the rectangle to produce a juncture called the side seam. The interlocking side seam extends lengthwise of the cylindrical body parallel to its axis to a point spaced slightly inwardly of each of the open ends where the marginal portions of the edges are secured by overlapping layers. Can bodies produced on wing-type and roll-form bodymakers are principally distinguished by the character of the overlapping layers produced and may be considered identical for the purpose of this discussion. The purpose of the overlapping layers or "laps," as they are also called, is to facilitate the attachment of the top and bottom of the can body by flanging and double seaming. The individual pieces of stock are lithographed or decorated where appropriate prior to introduction to bodymakers of this type.

The relative complexity of the interlocked side seam limits the productive capacity of both the wing-type and roll-form bodymakers. That is, in order to form the interlocked side seam; reciprocating, non-uniform, step-by-step movement must be imparted to the operative instrumentalities of wing-type and roll-form bodymakers to form the fold in the opposite parallel edges of the discrete, rectangular pieces of sheet stock. The speed at which it is possible to make can bodies with these bodymakers is thus limited and, accordingly, the productivity of these machines is restricted. Further, the need to use discrete pieces of stock has encumbered the automation or integration of bodymakers of these types into a completely conveyorized assembly line.

The principal reason the can making industry has been saddled with or limited to the almost exclusive use of bodymakers generally of the two types discussed above has not been the superiority of cans manufactured thereon but rather on the industry's inability to cope with problems encountered in the manufacture of can bodies having lap seams. This is true not only as to the difficulties involved in bodymaker design but also as to ancillary operations such as side seam soldering. The outstanding problem which has heretofore been insolvable has been the problem of alinement or registration of a given can body blank with the operative instrumentalities employed to form a finished can body. The problems of alinement or registration are multiplied when lap seam can bodies are to be made by performing the required forming operations on a continuous sheet of stock and, accordingly, have been a primary reason for the industry's failure to provide a method of manufacturing can bodies at high speed.

The problems of alinement encountered in the manufacture of can bodies having lap seams from a continuous sheet are not present when bodymakers of the types discussed above are used to manufacture can bodies having interlocked side seams as discrete, pre-cut blanks are introduced to these bodymakers. Further, the interlocked side seam formed on these bodymakers provides means which facilitates registration in subsequent operations. That is, once the marginal portions are folded they may be interlocked to establish essentially permanent can body configuration whereby subsequent alinement problems may be solved by use of the interlocked seam as a convenient reference and guide means. On the contrary, lap seam can bodies do not provide similar means for maintaining the configuration imparted by the bodymaker.

In order to perform the side seam soldering operation, the side seam has to be exactly alined with the solder applying instrumentalities. Can bodies having an interlocked side seam may be conveniently alined or guided by the provision of means engageable within the interlocked side seam whereby the seam is positioned relative to solder applying means. The use of such guide means is possible on can bodies having interlocked seams as a re-entrant groove of the seam extends substantially radially inwardly of the can body circumference. It is not possible with can bodies having lap seams unless complex internal and external guide means are provided as the gap or groove normally extends circumferentially inwardly between the two overlapping layers, reference is made to FIGS. 1 and 2 which illustrate the problem just discussed. Further, engagement of guide means with a lap seam would result in distortion of the seam as the overlapping layers are subject to displacement until solder has been applied thereto and allowed to set. Thus, in order to complete the side seam soldering of can bodies having lap seams, alinement normally must be established with reference to portions of the can body other than the side seam. The obviousness of this conclusion is not mached by an apparent or obvious solution since there is usually no other discontinuity in the surface of the can body which may be utilized for this purpose. This invention solves the problem by the provision of holes in a continuous sheet at the leading and trailing ends of a given can body blank, as disclosed hereinafter in the specification.

As noted above, where it is desired to lithograph or decorate a can body, this operation is normally performed prior to forming the can body in the bodymaker. Heretofore, this operation has been performed after the stock was cut into individual, rectangular pieces and, thus, alinement of the individual pieces with the instrumentalities used to lithograph or decorate them was easily accomplish. However, where it is desired to lithograph or decorate a continuous sheet of stock which will subsequently be divided into discrete can body blanks, intricate means must be provided to insure precise alinement. The complexity of this task is evidenced by lack of commercial success by the can making industry in providing such means despite extensive research in all areas relating to automation. The continuous sheet must be exactly registered with the operative instrumentalities to ensure that the design to be applied is properly located on the particular can body blank without overlapping the adjacent leading and/or trailing blank(s). Improper registration will result in discontinuities in the design on each can body subsequently formed, i.e. overlapping will result in portions of a given design appearing in non-uniform fashion whereby the bottom of a given design will be located on the top of a can body, etc. Misalinement will be magnified exponentially unless initial lack of registration can be eliminated or rectified during the process.

Accordingly, it is an object of this invention to provide a method of making can bodies by the performance of the forming operations on a continuous sheet of stock.

It is a further and more specific object of this invention to provide a method of making can bodies having lap seams from a continuous sheet of stock which is sequentially exposed to a plurality of machines used to implement said method.

It is a still further and more specific object of this invention to provide apparatus for forming a can body from a continuous sheet of stock.

To these ends and in accordance with a feature of this invention there is provided a method of manufacturing can bodies from a continuous sheet of stock comprising punching a plurality of holes in said continuous sheet of stock spaced at a distance corresponding to the height of can bodies to be manufactured therefrom, cutting said continuous sheet of stock on opposite sides of said holes along lines extending through said holes transversely of said sheets whereby the continuity of said sheets is maintained only in the area proximate to said holes, scoring said continuous sheet along said transverse lines in proximity to said holes whereby to facilitate the subsequent separation of successive can bodies, deforming said cut and scored continuous sheet into a plurality of can bodies, and motivating said continuous sheet of stock by means of a plurality of members engageable within said holes.

There is provided in accordance with a further feature of this invention apparatus for manufacturing can bodies from a continuous sheet of stock comprising means for punching a plurality of spaced holes in said continuous sheet of stock, said holes being spaced a distance corresponding to the height of can bodies to be manufactured from said sheet whereby successive holes define a can body, means for cutting said continuous sheet of stock on opposite sides of said holes along lines which extend through said holes transversely of said sheet whereby the continuity of said continuous sheet of stock is maintained only in the area proximate to said holes, means for scoring said continuous sheet along said transverse lines in proximity to said holes whereby to facilitate subsequent separation of successive can bodies, means for establishing registration between said holes and said cutting means and said scoring means, means for deforming said cut and scored continuous sheet of stock into a plurality of can bodies defined by successive holes, and means engageable within said holes for motivating said continuous sheet of stock.

The above and other features of the invention, including various novel details of construction and combinations of parts, will now be more particularly described with reference to the accompanying drawings and pointed out in the claims. It will be understood that the apparatus embodying the invention is shown by way of illustration and not as a limitation of the invention. The principles and features of this invention may be utilized in varied and numerous embodiments and applications without departing from the scope of the invention.

In the drawings,

FIG. 1 is an end view of a portion of a can body having a lap seam;

FIG. 2 is a sectional view of a portion of a can body having an interlock seam;

FIG. 3 is a perspective view illustrating a cutting and scoring roll employed in the preferred embodiment of this invention;

FIG. 4 is a perspective view of a can body manufactured in accordance with the subject invention;

FIG. 5 is a side view of apparatus illustrating the preferred embodiment of the subject invention;

FIGS. 6 to 8 are plan views of portions of a continuous sheet of stock during certain stages of the manufacturing cycle:

Figure 11:
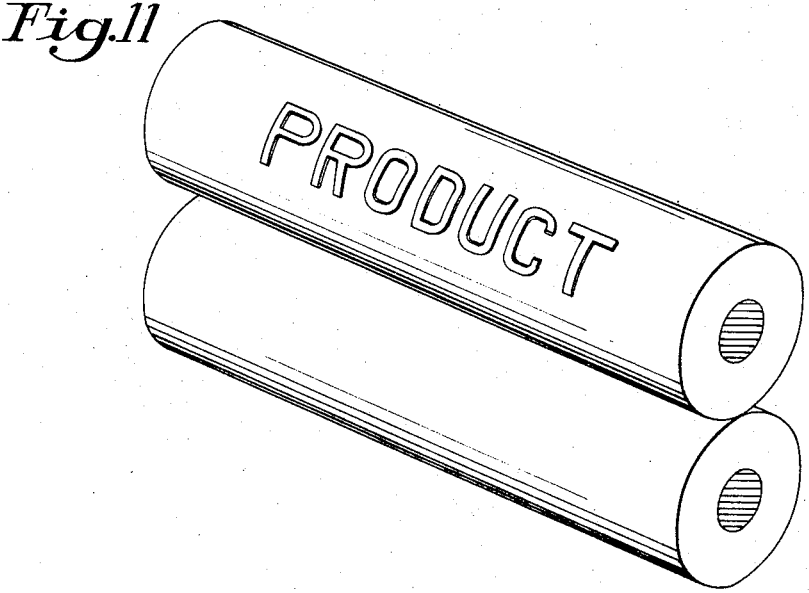
Figure 12:
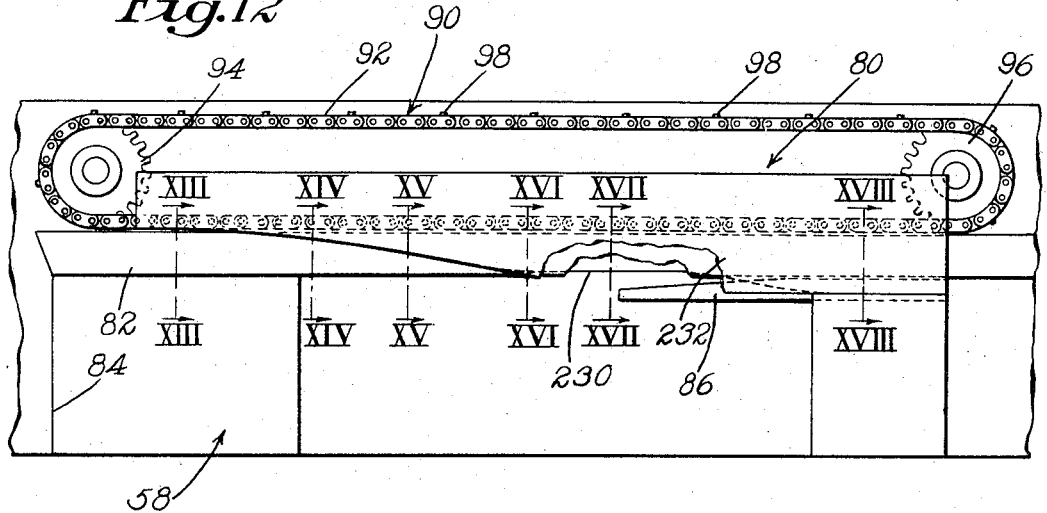

FIG. 6 after completion of the punching operation;

FIG. 7 after completion of the cutting and scoring operation;

FIG. 8 during the forming operation in the bodymaker;

FIG. 9 is a side view of apparatus of the punching station;

FIG. 10 is an end view of apparatus of the punching station;

FIG. 11 is a perspective view of the rolls employed, in the preferred embodiment, in the decorating station;

FIG. 12 is a front side view of the bodymaker of the invention with portions broken away to illustrate the configuration of the dies;

FIG. 13 is a sectional view taken along the line XIII—XIII of FIG. 12;

FIG. 14 is a sectional view taken along the line XIV—XIV of FIG. 12;

FIG. 15 is a sectional view taken along the line XV—XV of FIG. 12;

FIG. 16 is a sectional view taken along the line XVI—XVI of FIG. 12;

FIG. 17 is a sectional view taken along the line XVII—XVII of FIG. 12; and

FIG. 18 is a sectional view taken along the line XVIII—XVIII of FIG. 12.

Apparatus for performing a sequence of operations embodying the method of the subject invention is generally illustrated in FIG. 5. A continuous sheet of stock S is supplied from a roll 10. When a given roll of stock 10 has been exhausted, the illustrated production line need not be stopped as the leading end of another roll of stock may be quickly spliced or otherwise joined to the trailing end of the exhausted roll by conventional flying splice equipment (not shown) without halting the introduction of the stock to the operative instrumentalities shown in FIG. 5.

The continuous sheet of stock S is initially introduced to a punching station 12 wherein holes 14 are punched in the stock as illustrated in FIG. 8. The holes 14 may be of any convenient configuration and are illustrated as rectangular slots in the accompanying drawings. The discussion to follow will hereafter refer to the holes 14 as slots, it being clearly understood that any hole of convenient shape is included within the scope of this invention. The slots 14 are punched at intervals corresponding to the body height of the particular can size to be manufactured. The slots 14 are employed thereafter to progress the continuous sheet of stock S in cooperation with lugs located on motivating means as hereinafter described and to establish and maintain alinement or registration of a given can body blank B with the individual operative instrumentalities, also as hereinafter described. The punching instrumentalities, to be hereinafter described in detail, are illustrated in FIGS. 9 and 10 and include means for imparting movement to the continuous sheet of stock whereby the roll 10 is uncoiled.

Manufacture of can bodies B by the illustrated apparatus is initiated by feeding the leading end of a roll 10 of stock into rolls 15, 16 of the punching station 12. As stated above, continuous operation of the apparatus is thereafter sustained by splicing or otherwise joining additional rolls of stock to the trailing end of an exhausted roll 10. Immediately after the stock is punched, the spacing of the slots 14 is automatically checked by registration means 17 associated with the punching station 12. As hereinafter described in detail, the registration means 17 comprises a roll 18 having a plurality of lugs 19 circumferentially located uniformly thereon whereby the lugs 19 sequentially engage successive slots 14 when the roll 18 is rotated at a speed correlated to that of the stock established by the rolls 15, 16. The registration means 17 also serves as motivating means to translate the continuous sheet of stock whereby uniformity in movement is maintained. The rolls 15, 16 are motivated by a main drive shaft 21 driven by a motor M.

The exact location of the slots 14 may be altered by adjustment of the punching means, as hereinafter described, to facilitate manufacture of can bodies B of varying height and corresponding change of the roll 18. As stated above, the slots 14 are punched at intervals corresponding to the height of can bodies to be manufactured. When a given can body B is completed, a groove 20 (FIG. 4) of a depth equal to one-half the width of the slot 14 will be present in both the leading and trailing ends thereof. That is, as hereinafter described, the can bodies are sheared or severed transversely of the direction of feed of the stock S and along lines A—A extending longitudinally through the centers of the slots 14. Thus, one-half of the slots 14 will form a groove 20 in the trailing and leading ends of successive can bodies. The width of the slots 14 is relatively small and, therefore, the grooves 20 do not prevent or hamper the subsequent attachment of either a top or bottom to the tubular can body and do not adversely affect the strength of the finished can.

In the embodiment illustrated in FIG. 5, the can body stock is introduced to a decorating station 28 after completion of the punching operation. The decorating station comprises rolls 30, 32 and registration means 34. The rolls 30, 32 are rotated, as hereinafter described, at a speed equal to the speed at which the continuous sheet of stock is fed therebetween. The roll 32 is used to apply enamel to the lower surface of the continuous sheet of stock which will ultimately constitute the inner surface of can bodies formed therefrom. The roll 30 is employed as a matrix roll to impart decorative or identifying indicia to the upper surface of the continuous sheet of stock which will be the outside surface of can bodies formed therefrom. Accordingly, the rotative motion of the roll 30 must be in precise timed relation to the movement of the continuous sheet of stock S whereby a complete design is applied to a given portion of said continuous sheet which constitutes a particular can body blank B.

The registration means 34 comprises a roll 36 having a plurality of spaced, outwardly extending lugs 38 mounted thereon. The lugs 38 are circumferentially located uniformly on the roll 36 such that they will sequentially engage successive slots 14 when the roll 36 is rotated in timed relation to the movement of the stock. Rotative movement is imparted to the roll 36 by a continuous timing belt or chain 40 opposite ends of which are mounted on shafts coaxial with the roll 36 and the roll 32, respectively.

Rotative movement correlated with the movement of the means for imparting movement to the stock at the punching station is imparted to the roll 30 by any convenient means linked to the main drive shaft 21. Rotation of the roll 30 is translated to the roll 32 by any convenient means such as that utilized with respect to the rolls 15, 16, as hereinafter discussed. Thus, since rotation is imparted to the roll 36 by the belt 40 driven by the roll 32, correlation is established between the speed at which the rolls 30 and 36 are rotated. Correlation between the movement translated to the roll 36 from the roll 30 and the movement of the continuous sheet of stock is ensured by the sequential engagement of the lugs 38 within successive slots 14 in said stock. Registration of a given can body blank defined by successive slots 14 is thereby established with the matrix roll 30 whereby proper location of the decorative design is assured. The registration means 34 also functions as motivating means to maintain uniform translation of the stock as a result of the engagement of the lugs 38 within successive slots 14. The registration means thus ensures proper registration of the stock with the decorating instrumentalities and ensures continuous, uniform movement of the stock. The cooperative action of the slots 14, registration means 34 and matrix roll 30 assure proper application of the decorative design without the danger of overlapping of the design as discussed above.

The continuous sheet of stock is thereafter introduced to a drying station 46 in the embodiment illustrated in FIG. 5. The drying station serves to force dry the enamel and decorative or identifying indicia applied to the previous station. The drying may be accomplished by any convenient heating means such as induction heating means. Registration means need not be provided at the drying station as there is no criticality as to the application of heat and adequate motivation for the stock is supplied by the registration means associated with appurtenant stations.

The continuous sheet of stock next enters a cutting and scoring station 50 wherein the stock is cut and scored in the manner described hereinafter along the lines A—A (FIG. 7) which extend transversely of the strip S and longitudinally through the centers of the successive slots 14. The stock is cut on opposite sides of the slots 14 a distance extending from the sides of the stock to a point 51 (FIG. 7) displaced from the opposite ends of the slots 14. The line 52 in FIG. 7 represents the cut portion of the stock. The stock is scored along the lines A—A in proximity to the slots 14 at the portion designated by reference character 54 in FIG. 7 between the points 51 and the slots 14. The cut portions are of sufficient length to permit the subsequent formation of each can body blank B defined by successive slots 14 into a cylinder in a bodymaker 58 without discontinuity at the score portions 54. The scored portions 54 provide an integral link between successive can bodies of sufficient strength whereby the slots 14 may be subsequently used to impart and/or sustain movement of the stock and to assure alinement or registration thereof. After a can body is formed in the bodymaker 58, the stock is flexed along the score lines 54 whereby successive can bodies are readily parted.

The need to maintain precise registration of a particular can body blank defined by successive slots 14 with the cutting and scoring instrumentalities is patently obvious. Unless proper registration is maintained, the decorative indicia will be non-uniform in the finished can bodies, the cutting and scoring will be displaced from the slots 14 and the slots 14 will produce holes located intermediate the ends of the can bodies and, further, proper registration will not exist in the bodymaker.

The cutting and scoring station 50 generally comprises an upper roll 60, see particularly FIG. 3, having a plurality of spaced, outwardly extending cutting and scoring surfaces 62 and 64, respectively. The cutting and scoring surfaces are spaced circumferentially on the roll 60 such that stock fed thereunder sequentially will be cut and scored along the lines A—A defined above in the manner discussed above when the roll 60 is rotated appropriately. Rotative movement may be imparted to the roll 60 by any convenient means linked to the main drive shaft 21.

Registration or alinement is assured between the cutting and scoring surfaces 62, 64 of the roll 60 and the ends of a given can body blank defined by successive slots 14 by registration means 68 (FIG. 5) similar to the registration means 34 associated with the punching station 28. The registration means 68 comprises a roll 70 having a plurality of spaced, outwardly extending lugs 72 mounted thereon. The lugs are circumferentially located uniformly on the roll 70 such that they will sequentially engage successive slots 14 in the stock when the roll 70 is rotated in timed relation to the movement of the stock. Rotative movement is imparted to the roll 70 by a continuous timing belt or chain 76 opposite ends of which are mounted on shafts coaxial with the roll 70 and a roll 78 respectively, rotative movement of the roll 60 being translated to the roll 78 by any convenient means such as that associated with the rolls 15, 16, as hereinafter discussed. Correlation is thereby established between the rotative movement of the rolls 60 and 70 and, therefore, between the movement of the stock S and the rotative movement of the roll 60. Thus, registration is assured between the cutting and scoring surfaces 62, 64 of the roll 60 and the ends of a particular can body blank defined by successive slots 14 which are sequentially engaged by the lugs 72. As at the decorating station, the registration means also functions as motivating means to sustain the uniform movement of the stock. In an alternate embodiment, the cutting and scoring station may be integrated with the bodymaker station 58 to be hereinafter described.

After completion of the cutting and scoring operation, the continuous sheet of stock is introduced to the bodymaker 58. The structure of the bodymaker 58 will be described in detail hereinafter and, therefore, only that structure necessary to facilitate a discussion of the method of the invention presently will be described. The bodymaker 58 essentially comprises an elongated die 80 (FIGS. 12 to 18) having side members A and B which depend on opposite sides of a can line defined by a continuous line extending through the centers of successive slots 14. The side members A and B of the die 80 cooperate with an elongated mandrel 82 cantilevered outwardly from a support member 84 to form the cut and scored, continuous sheet of stock into cylindrical can bodies; each side member being in the form of a helix whereby the flat can body blanks are progressively urged into cylindrical contour about the mandrel 82. The longitudinal sides of the stock are overlapped at the terminal portion of the elongated, helical die 80 and a second die 86 having an upper, camming surface progressively urges the overlapped sides into intimate, overlapping contact.

The continuous sheet of stock S is moved during its passage through the bodymaker 58 by motivating means generally indicated by the reference character 90. The motivating means 90 also functions to maintain alinement or registration of the continuous sheet of stock in the bodymaker 58, as hereinafter described. The motivating means 90 comprises a continuous chain 92 mounted on displaced sprockets 94, 96 and having a plurality of spaced lugs 98 mounted thereon. The location of the lugs 98 on the chain 92 is such that the lugs 98 sequentially engage successive slots 14 in the continuous sheet of stock S to impart movement to and/or maintain movement of said stock. The chain 92 may be moved by any convenient means (not shown) associated with either of said sprockets 94, 96. The motion of the chain 92 must be in timed relation to the movement imparted to the stock by the registration means 68, 34 and 17 and, accordingly, the moving means associated with the chain 92 is preferably linked directly by any convenient means (not shown) to the main drive shaft 21. The sequential engagement of the lugs 98 within successive slots 14 not only functions to move the continuous sheet of stock but also to ensure alinement or registration of the can body blanks with the forming instrumentalities of the bodymaker 58. That is, the engagement of a plurality of lugs 98 within a plurality of successive slots 14 prevents transverse movement of the can line defined by successive slots 14 relative to the legs of the die 80 in response to the forces exerted by said die.

While the can body blanks B are in the cylindrical form generally described above and illustrated in FIG. 4, solder, "hot melt" nonmetallic adhesive or other material for bonding the overlapping longitudinal sides is applied to the lap seam 100 by apparatus of the preferred embodiment shown in FIG. 5. The bonding material is applied at an application station 102. The can bodies are maintained in cylindrical contour and the overlapping portions C and D of the side seam in contact during application of bonding material by dies similar to those associated with the terminal portion of the bodymaker 58. The die or guide 103 employed to maintain the overlapping portions C and D of the side seam in contact is provided with an opening at the application station 102 to permit positioning of an applicator 104 in close proximity to the lap seam. The applicator 104 may be of any convenient design.

Movement is imparted to and/or sustained in the continuous chain of can body blanks B during its passage through the application station 102 by motivating means 106 identical to that employed in the bodymaker, as described above. Alternatively, the application station 102 may be integrated with the bodymaker whereby the motivating means 90 of the bodymaker, in extended form, may be employed to translate the linked can body blank past the applicator 104. Likewise, insuch alternative embodiment, where desired, the dies associated with the bodymaker may be extended to include the bonding operation. The motivating means 106 also functions to ensure alinement or registration between the lap seam and the applicator. That is, the engagement of a plurality of lugs 108 on a continuous chain 109 within successive slots 14 prevents rotational or pivotal movement of a given can body B relative to the applicator 104 thereby to ensure proper application of the bonding material within each lap seam 100.

When it is desired to bond the lap seams on the can body blanks B with adhesive, the adhesive may be applied at a number of points in the sequence of operations illustrated in FIG. 5 without departing from the scope of this invention. For example, adhesive may be applied immediately after the roll 10 is uncoiled, then the adhesive set by drying, and reactivated after the lap seam has been formed. Likewise, the adhesive could be applied at the decorating station, set in the drying station, and reactivated after the lap seam has been formed. The application of adhesive may be applied by any convenient means (not shown) such as a pair of rolls mounted on opposite sides of the can line. Reactivation of the adhesive may be accomplished by locating any convenient heating means (not shown) in close proximity to the formed lap seams. A further alternative embodiment employing adhesive would be to apply adhesive immediately prior to the formation of the lap seam whereby to eliminate the need for reactivation.

The bonded can bodies are thereafter conveyed along a support chain 110 a distance sufficient to permit solidification or setting of the bonding material. The can body is moved during this period by motivating means 112 identical to that associated with the bodymaker 58. The support chain 110 and motivating means 112 cooperate to maintain the cylindrical configuration of the can bodies. In an alternative embodiment, a die having a contour similar to that of the terminal portion of the helical die associated with the bodymaker may be used to assist in maintenance of the cylindrical configuration of the can bodies B. Again, as in the case of the application station, the solidification or setting apparatus may be incorporated in the bodymaker 58 by appropriate extension of the motivating means and dies associated therewith.

In a further alternative, an essentially V-shaped guide may be employed in place of the support chain 110 and the can bodies slid therealong by motivating means 112.

Manufacture of the can bodies is completed at the break station 120 wherein the can bodies are separated by parting the linked can bodies along the score lines 54. This is accomplished by feeding the can bodies around an arc of one or more rolls 122 (only one being shown) whereby the weakened scored portions are flexed until broken. The roll 122 is provided with a plurality of spaced lugs 124 engageable within the slots 14 whereby the linked can bodies are moved until they are separated as discussed above. The completed can bodies may thereafter be removed by any convenient means (not shown).

The structure of the punching station 12 will now be described in more detail with particular reference to FIGS. 9 and 10, it is to be initially understood that the structure of the punching station may be employed in a similar manner at the decorating and cutting and scoring stations when certain minor modifications are completed to accommodate use of the rolls 30 and 60, respectively, with said structure, as hereinafter described. As best illustrated in FIG. 10, the roll 15 has a plurality of punching members 140 spacially mounted in a central portion thereof. The punching members 140 cooperate with a plurality of complementarily disposed cavities or dies 142 spacially mounted in the roll 16 to punch the slots 14 in a sheet of stock passing therebetween. Rotation is imparted to the rolls 15 and 16 by a drive shaft 146 linked to the main drive shaft 21 in any conventional manner (not shown); rotative movement of the drive shaft 146 being translated to a shaft 150 on which the roll 16 is mounted by gears 152, 154. Rotative movement of the shaft 150 is translated to a shaft 160 on which the roll 15 is mounted by a gear train 162 comprising gears 164, 166, 168 and 170.

Movement imparted to the rolls 15 and 16 in the aforesaid manner is translated to a sheet of stock S introduced therebetween by a plurality of circumferential bands 174 of elastomeric material spacially and complementarily located on the rolls 15 and 16. The bands 174 may be secured to the rolls 15 and 16 in any convenient manner. The bands 174 function to initiate movement to the leading end of a roll of stock S when it is first introduced to the punching station and to sustain the movement of the stock S thereafter in cooperation with the various registration means discussed above.

As noted above, slots 14 are punched in a continuous sheet of stock S by the cooperative action of punching members 140 mounted on the roll 15 and cavities or dies 142 located in the lower roll 16. More specifically, as the rolls 15 and 16 are rotated thereby translating a sheet of stock located therebetween, the punching members 140 which are spacially located on the roll 15 in accordance with the height of can bodies to be manufactured engage the stock S and punch out a portion thereof. The punched out portion of the stock and the outer portion of the punching means 140 are received in one of the cavities 142 at the time the punching operation is completed thereby to ensure that the punched portion is completely removed and slots 14 are formed properly. The exact location of the punching means 140 and cavities 142 may be altered to facilitate manufacture of can bodies of varying height. The punched out portion of the stock is removed from the particular cavity 142 under the force of gravity as the roll 16 rotates.

The punching means 140 and cavities 142 thus cooperate to punch spaced, successive slots 14 in a continuous sheet of stock which thereafter may be employed to sustain the movement of the stock S and to establish registration between a given can body blank B and the operative instrumentalities, as described above. The punching means 140 and cavities 142 must therefore be in precise alinement at the time the punching operation is completed. This is accomplished by the gear train 162 which establishes a direct ratio between the rotational movement of the rolls 15 and 16. However, due to the inherent degree of inaccuracy in gear trains of this type and the potential danger of severe damage to both the punching means 140 and cavities 142 if misalinement occurs, additional means must be provided to ensure alinement. That is, misalinement can result in breaking off of the punching means 140 and/or in removal of portions of the sidewall of the cavity 142. This is in addition to the inability properly to form the slots 14 when the rolls 15 and 16 are not precisely registered. Accordingly, vernier adjustment means 180 are provided comprising a plurality of female members 182 mounted on a side of the roll 15 and a plurality of male members 184 mounted at complementary locations on the corresponding side of the roll 16.

Thus, when the rolls 15 and 16 are rotated in correct timed relation and a particular punching member 140 is moved into an alined position with respect to the complementary cavity 142 on the roll 16, one of said male members 184 will be received in a complementary female member 182. If, however, misalinement exists, it will be corrected or the rolls 15 and 16 jammed or stopped as a result of the forces resulting from the engagement of the male member 184 with the female member 182.

The proper amount of tension is maintained in the continuous sheet of stock S by doctor rolls 190, 190; adjustment of which may be accomplished by adjustment of screw means 192, 192 in conventional manner. The doctor rolls 190, 190 maintain the continuous sheet of stock S in contact with the surface of the roll 16 along an arc the ends of which are displaced from the point of contact of the tangent line common to the rolls 15 and 16, i.e., the point at which a particular punching member 140 and the cavity 142 are in alinement. Premature engagement of the punching member 140 with the stock is thereby prevented.

As discussed above and as particularly illustrated in FIG. 9, the location of the successive slots 14 is thereafter checked by registration means 17. The registration means 17 comprises a roll 18 having a plurality of lugs 19 located thereon whereby the lugs 19 sequentially engage successive slots 14. In the preferred embodiment, the roll 18 is rotated in timed relation to the rotation of the rolls 15 and 16 and, therefore, to the movement of the stock S by a continuous chain 200 opposite ends of which are mounted on sprockets 202, 204 mounted on the roll 18 and gear 164, respectively. In the alternative, a continuous belt may be used as discussed above with respect to the registration means 34 and 68. The lugs 19 will thus sequentially engage successive slots 14 punched by the punching members 140 when the apparatus functions properly and, further, will motivate the continuous sheet of stock S as a result of engagement of the lugs 19 within successive slots 14.

When a slot 14 is punched in improper location, the slot 14 will not be engaged by a lug 19 as a result of the timed relation of rotation of the rolls 15, 16 and 18 discussed above. On the contrary, a lug 19 will engage the lower surface of the socket S and impart upward movement thereto whereby the stock will be pressed into contact with a depending portion 210 of a sensing switch 212. The switch 212 is thereby activated to record the discrepancy in slot spacing. Conventional means (not shown) are employed to connect the switch 212 to the motor M whereby the entire line of machinery may be turned off to permit remedial action. The registration means 17, as well as the registration means 34, 68, 90 and 106, may be altered by adjustment of the lugs associated therewith to accommodate can bodies of varying height.

The structure of the decorating station and cutting and scoring station are generally distinguishable from that of the punching station just described in that the associated registration means 34 and 68 are located in advance of the operative rolls 30 and 60. This is due to the fact that the registration means 17 is used to check the location of the slots 14 formed in the punching station whereas the registration means 34 and 68 are employed to assure and/or establish registration between a given can body blank defined by successive slots 14 and the rolls 30 and 60 which will subsequently perform an operation thereon. The structural alterations necessary to accomplish such a relocation of the registration means described with relation to the punching station are readily apparent to the skilled artisan and, accordingly, will not be the subject of further discussion here.

In order to utilize the structure illustrated in FIGS. 9 and 10 and described hereinabove at the decorating station, the rolls 15 and 16 would have to be replaced by rolls similar to that illustrated in FIG. 11. Further, the doctor rolls 190, 190 must be removed whereby not to erase or smear the coatings applied at the decorating station. The modifications required to facilitate the use of the said structure at the punching and scoring station include replacement of the rolls 15 and 16 by the rolls 60 and 78, as illustrated in FIG. 3. The roll 78 comprises a plurality of spacially located, elongated grooves 222 which cooperate with the cutting surfaces 62 and scoring surfaces 64 to cut and score the continuous sheet of stock S. That is, the portion of the grooves 222 cooperative with the cutting surfaces 62 provide a cavity into which the material to be cut may be pressed. The portion of the groove 222 cooperative with the scoring surfaces 64 functions in a similar manner.

The bodymaker 58 will now be described in detail with particular reference to FIGS. 12 to 18. As discussed above, the bodymaker 58 comprises an elongated die 80 having side members A and B, hereinafter identified by the reference characters 230, 232, respectively, which depend on opposite sides of the can line, i.e. the line of engagement of the lugs 98 with successive slots 14. The side members 230, 232 are each in the form of a helix, as best appreciated by a study of the sectional views 13 to 18. The die 80 may be mounted on the frame of the machine in any convenient, conventional manner. A given can body blank B is formed into a cylinder by the cooperation of the side members 230, 232 of the die 80 and the mandrel 82 mounted on the frame member 84. The planar can body blank is progressively deformed into cylindrical contour under the forces applied by the helical camming surfaces 236, 238 of the side members 230, 232, respectively, which engage the can body blank whereby to wrap the can body blank around the mandrel 82. As best illustrated in FIG. 12 and the sectional view of FIG. 16, the helix which describes the contour of the surface 236 of the side member 230 has a greater angle of declination than that defining the surface 238 in the central portion of the die 80 whereby the right hand side of the can body blank, as viewed in FIG. 16, will be urged into contact with the mandrel 82 in advance of the left hand side of the can body blank. Interference between the sides of a given can body blank is thereby avoided. As illustrated in FIG. 17, the helical surfaces 236, 238 are symmetrical at the terminal portion of the die 80 whereby the sides of the can body blank are urged into overlapping relation.

When the side members 230, 232 of the die 80 have placed the sides of a given can body blank in overlapping relation, as shown in FIG. 17, the overlapping portions are then urged into intimate, continuous contact by a second die 86, see FIG. 18. The die 86 is generally in the form of an inclined surface whereby the overlapping layers are progressively urged into contact. The die 86 may be mounted on the frame of the machine in any convenient manner. The can body blanks thus formed are thereafter maintained in the configuration illustrated in FIG. 17 while the bonding means are applied and set by any convenient means. In the alternative construction wherein adhesive is applied prior to formation of the bodymaker, the adhesive may be activated with the can body in the configuration illustrated in FIG. 18 as, for example, by a heated mandrel.

The motivating means 90 of the bodymaker 58 was described in detail hereinabove and will not be discussed further except to point out that the engagement of a plurality of lugs 98 within a plurality of successive slots 14 of the can body blanks under the action of the forces exerted by the die 80, except that movement associated with the deformation of the planar can body blanks into cylinders.

In review of the preferred embodiment delineated above, a roll of stock S is introduced to a punching station wherein a plurality of slots are punched in the continuous sheet of stock, said slots 14 being spaced in accordance with the can body height of cans to be manufactured. The spacing of the slots is immediately checked by the registration means 17. The continuous sheet of stock thereafter is fed to the decorating station wherein the registration means 34 establishes registration between a given can body blank and the decorating roll 30. The decorative indicia is then dried and the continuous sheet of stock fed into the cutting and scoring station wherein registration between a given can body blank and the cutting and scoring roll 60 is established or insured by the registration means 68. The continuous sheet then enters the bodymaker wherein the die 80 progressively deforms the planar can body into a cylinder. Solder or other bonding material is then applied at the bonding station and the can body blank progressed to the setting station. In the final step in the operation, the can bodies are flexed about an arc whereby the linking portions surrounding the slots 14 are fatigued and the can bodies separated.

Having thus described my invention what I claim as new and desire to secure by Letters Patent of the United States is:

1. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, partially severing the defined blanks from said continuous web by cutting into opposite sides of the web along lines which extend through said holes, the innermost end of the cuts being spaced from the holes whereby the continuity of said web is maintained only in the area proximate to said holes, deforming said cut blanks while still integral with said web into a plurality of tubular bodies defined axially by successive holes and cuts and progressively moving said continuous web by means engageable within said holes.

2. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, partially severing the defined blanks from said continuous web by cutting into opposite sides of said web along lines which extend through said holes, the innermost ends of the cuts being spaced from the holes whereby the continuity of said web is maintained only in the area proximate to said holes, scoring said web along said lines in proximity to said holes whereby to facilitate subsequent separation of successive tubular bodies, deforming said cut blanks while still integral with said web into a plurality of tubular bodies defined axially by successive holes and cuts and progressively moving said continuous web by means engageable within said holes.

3. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, partially severing the defined blanks from said continuous web by cutting into opposite sides of the web along lines which extend through said holes, the innermost end of the cuts being spaced from the holes whereby the continuity of said web is maintained only in the area proximate to said holes, deforming said cut blanks while still integral with said web into a plurality of tubular bodies defined axially by successive holes and cuts, progressively moving said continuous web by means engageable within said holes, and separating said tubular bodies along said lines which pass through said holes.

4. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, partially severing the defined blanks from said continuous web by cutting into opposite sides of said web along lines which extend through said holes, the innermost end of the cuts being spaced from the holes whereby the continuity of said web is maintained only in the area proximate to said holes, scoring said web along said lines in proximity to said holes whereby to facilitate subsequent separation of successive tubular bodies, deforming said cut blanks while still integral with said web into a plurality of tubular bodies defined axially by successive holes and cuts, progressively moving said continuous web by means engageable within said holes, and separating said tubular bodies along said lines which pass through said holes.

5. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, decorating successive body blanks defined by said successive holes by means of a roll rotated in timed relation to the movement of said web, partially severing the defined blanks from said continuous web by cutting into opposite sides of the web along lines which extend through said holes, the innermost end of the cuts being spaced from the holes whereby the continuity of said web is maintained only in the area proximate to said holes, deforming said cut blanks while still integral with said web into a plurality of tubular bodies defined axially by successive holes and cuts and progressively moving said continuous web by means engageable within said holes.

6. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, decorating successive body blanks defined by said successive holes by means of a role rotated in timed relation to the movement of said web, partially severing the defined blanks from said continuous web by cutting into opposite sides of the web along lines which extend through said holes, the innermost end of the cuts being spaced from the holes whereby the continuity of said web is maintained only in the area proximate to said holes, deforming said cut blanks while still integral with said web into a plurality of tubular bodies defined axially by successive holes and cuts, progressively moving said continuous web by means engageable within said holes, and separating said tubular bodies along said lines which pass through said holes.

7. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, partially severing the defined blanks from said continuous web by cutting into opposite sides of said web along lines which extend through said holes, the innermost end of the cuts being spaced from the holes whereby the continuity of said web is maintained only in the area proximate to said holes, deforming said cut blanks while still integral with said web into a plurality of tubular bodies having overlapping side seams defined axially by successive holes and cuts, applying bonding material to said overlapping side seams, and progressively moving said continuous web by means engageable within said holes.

8. A method of manufacturing tubular bodies from a continuous web of stock comprising the steps of forming a plurality of holes in said continuous web at uniform distances corresponding to the axial height of tubular bodies to be manufactured from said web whereby successive holes define body blanks, partially severing the defined blanks from said continuous web by cutting into opposite sides of said web along lines which extend through said holes, the innermost end of the cuts being spaced from the holes whereby the continuity of said web is maintained only in the area proximate to said holes, deforming said cut blanks while still integral with said web into a plurality of tubular bodies having overlapping side seals defined axially by successive holes and cuts, applying bonding material to said overlapping side seams, progressively moving said continuous web by means engageable within said holes and separating said tubular bodies along said lines which pass through said holes.

9. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for deforming said cut blanks while still integral with said web into a plurality of tubular bodies defined axially by successive holes and cuts and means engageable within said holes for moving said web continually past said punching, said partial severing and said deforming means.

10. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for deforming said cut blanks while still integral with said web into a plurality of tubular bodies defined axially by successive holes and cuts, means for separating the tubular bodies along said lines which pass through said holes, and means engageable within said holes for moving said web continually past said punching, said partial severing and said deforming means.

11. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for scoring said web along said lines in proximity to the holes thereby to facilitate separation of successive tubular bodies from the web, means for deforming said cut blanks while still integral with said web into a plurality of tubular bodies defined axially by successive holes and cuts, and means engageable within said holes for moving said web continually past said punching, said partial severing and said deforming means.

12. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for establishing registration between the holes and the partial severing means, means for deforming said cut blanks while still integral with said web into a plurality of tubular bodies defined axially by successive holes and cuts, and means engageable within said holes for moving said web continually past said punching, said partial severing and said deforming means.

13. Apparatus for manufacturing tubular bodies from a continuous web of stock comprising means for punching a plurality of holes in said continuous web at uniform distances corresponding to the axial height of tubular bodies to be manufactured from said web whereby successive holes define body blanks, said punching means comprising a rotatable member having a plurality of punching members spacially disposed about the circumference thereof whereby said punching members sequentially punch said holes in the continuous web of stock, means for partially severing the defined blanks from said continuous web by cutting into opposite sides of said web along lines which extend through said holes, the innermost end of the cuts being spaced from the holes whereby the continuity of said web is maintained only in the area proximate to said holes, means for deforming said cut blanks while still integral with said web into a plurality of tubular bodies defined axially by successive holes and cuts and means engageable within said holes for moving said web continually past said punching, said partial severing and said deforming means.

14. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, said partial severing means comprising a rotatable member having a plurality of raised cutting surfaces spacially mounted thereon, means for deforming said cut blanks while still integral with said web into a plurality of tubular bodies defined axially by successive holes and cuts, and means engageable within said holes for moving said web continually past said punching, said partial severing and said deforming means.

15. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for deforming said cut blanks while still integral with said web into a plurality of tubular bodies defined axially by successive holes and cuts, said deforming means comprising an elongated mandrel and an elongated die having depending portions engageable with the continuous web to urge the web into contact with the mandrel thereby to form the body blanks into cylinders, and means engageable within said holes for moving said web continually past said punching, said partial severing and said deforming means.

16. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for deforming said cut blanks while still integral with said web into a plurality of tubular bodies defined axially by successive holes and cuts, and means engageable within said holes for moving said web continually past said punching, said partial severing and said deforming means comprising a rotatable member having a plurality of lugs spacially mounted thereon sequentially engageable within successive holes when the rotatable member is rotated.

17. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of the web along lines which extend through said holes, the innermost end of the cuts being spaced from the holes whereby the continuity of said web is maintained only in the area proximate to said holes, means for scoring the web along said lines in proximity to the holes thereby to facilitate separation of successive tubular bodies from said web, means for deforming said cut blanks while still integral with said web into a plurality of tubular bodies defined axially by successive holes and cuts, means for separating said tubular bodies along said lines which pass through said holes, and means engageable within said holes for moving said web continually past said punching, said partial severing and said deforming means.

18. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for scoring the web along said lines in proximity to the holes thereby to facilitate subsequent separation of successive tubular bodies from said web, means for establishing registration between the holes and the partial severing means, means for deforming said cut blanks while still integral with said web into a plurality of tubular bodies defined axially by successive holes and cuts, means for separating said tubular bodies along said lines which pass through said holes, and means engageable within said holes for moving said web continually past said punching, said partial severing and said deforming means.

19. Apparatus for manufacturing tubular bodies from a continuous web of stock comprising means for forming a plurality of holes in said continuous web at uniform distances corresponding to the axial height of tubular bodies to be manufactured from said web whereby successive holes define body blanks, means for partially severing the defined blanks from said continuous web by cutting into opposite sides of said web along lines which extend through said holes, the innermost end of the cuts being spaced from the holes whereby the continuity of said web is maintained only in the area proximate to said holes, means for scoring the web along said lines in proximity to the holes thereby to facilitate separation of successive tubular bodies from the web, means for establishing registration between said holes and said partial severing means and said scoring means comprising rotatable means having a plurality of lugs spacially mounted thereon sequentially engageable within successive holes when the rotatable means is rotated in timed relation to movement of said stock and means linking said rotatable means and said partial severing and said scoring means whereby to establish correlation between the movements thereof, means for deforming said cut blanks while still integral with said web into a plurality of tubular bodies defined axially by successive holes and cuts, and means engageable within said holes for moving said web continually past said punching, said partial severing and said deforming means.

References Cited

UNITED STATES PATENTS

| | | | |
|---|---|---|---|
| 2,187,740 | 1/1940 | Hothersall | 113—120 |
| 2,444,463 | 7/1948 | Nordquist | 113—120 |
| 3,204,847 | 9/1965 | Vitense | 113—120 |
| 3,215,107 | 11/1965 | Cvacho et al. | 113—120 |

RICHARD J. HERBST, *Primary Examiner.*

UNITED STATES PATENT OFFICE

CERTIFICATE OF CORRECTION

Patent No. 3,348,510                        October 24, 1967

Frederick S. Sillars

It is hereby certified that error appears in the above numbered patent requiring correction and that the said Letters Patent should read as corrected below.

In the heading to the printed specification, line 4, for "Frederick S. Sillars, 6 Grover St., Beverly, Mass. 01915" read -- Frederick S. Sillars, Beverly, Mass., assignor to United Shoe Machinery Corporation, Boston, Mass., a corporation of New Jersey --; column 2, line 56, for "accomplish" read -- accomplished --; column 12, line 43, for "ends" read -- end --; column 14, line 5, for "seals" read -- seams --.

Signed and sealed this 26th day of November 1968.

(SEAL)
Attest:

Edward M. Fletcher, Jr.

Attesting Officer

EDWARD J. BRENNER

Commissioner of Patents